Figure 1:
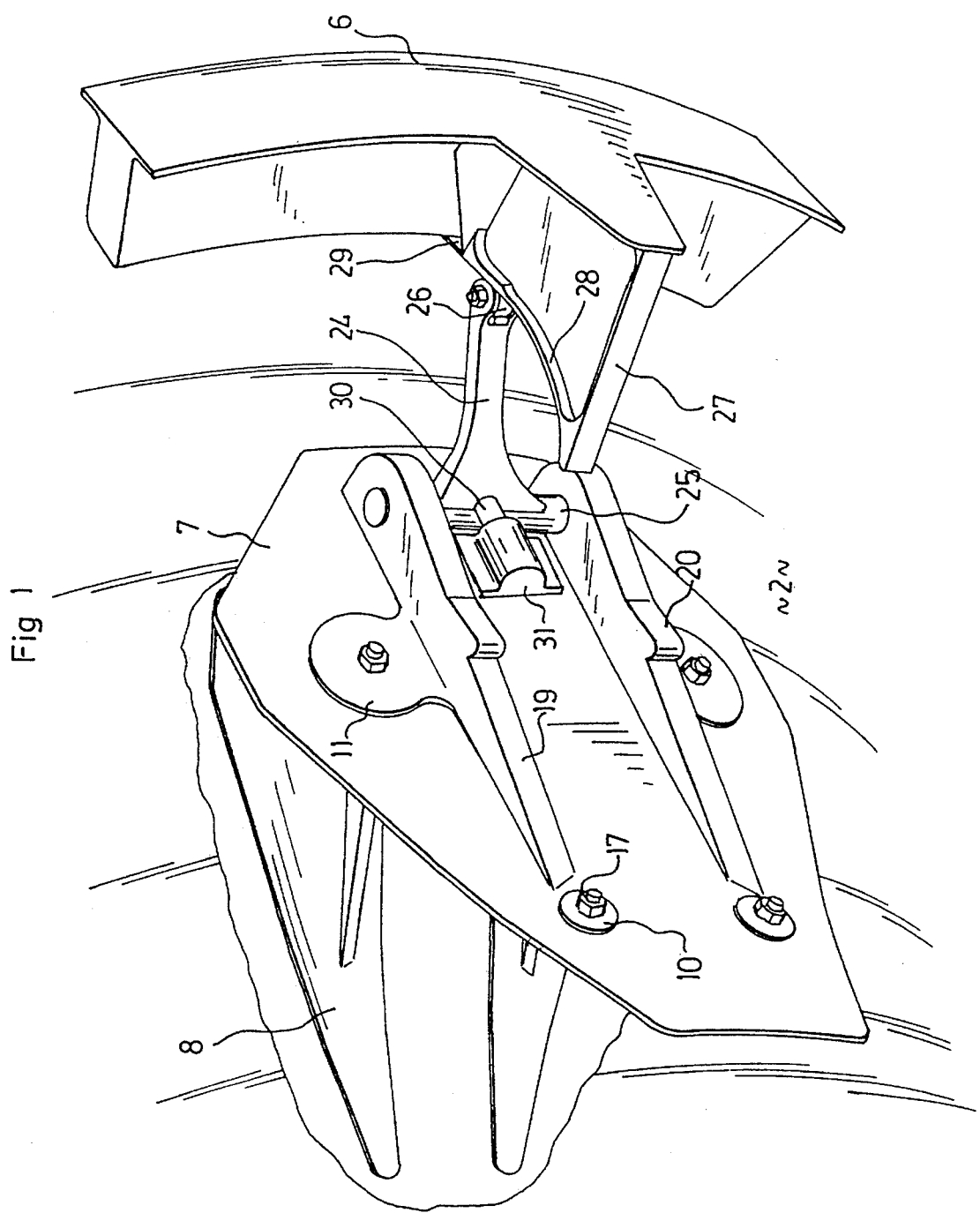

United States Patent [19]
Servanty

[11] Patent Number: 5,495,710
[45] Date of Patent: Mar. 5, 1996

[54] DUAL-FLOW TURBINE ENGINE EQUIPPED WITH A THRUST REVERSAL SYSTEM AND A DEVICE FOR RESTRICTING THE ANNULAR CHANNEL FOR THE EJECTION OF COLD GASES, AND A RESTRICTION DEVICE EQUIPPING SUCH A TURBINE ENGINE

[75] Inventor: Guy Servanty, Leguevin, France

[73] Assignee: Conception Aeronautique du Sud-Ouest, Blagnac, France

[21] Appl. No.: 408,962

[22] Filed: Mar. 23, 1995

[30] Foreign Application Priority Data

Mar. 28, 1994 [FR] France .................................. 94 03919

[51] Int. Cl.$^6$ ........................................................ F02K 3/02
[52] U.S. Cl. .................... 60/226.2; 60/230; 239/265.29; 244/110 B
[58] Field of Search ................................... 60/39.01, 222, 60/226, 230; 239/265.15, 265.27, 265.29, DIG. 22, 265.13; 244/110 B; 277/27

[56] References Cited

U.S. PATENT DOCUMENTS

| | | | |
|---|---|---|---|
| 3,330,115 | 7/1967 | Markowski | 60/262.2 |
| 4,052,007 | 10/1977 | Willard | 239/265.29 |
| 4,362,015 | 12/1982 | Fage | 239/265.29 |
| 4,462,207 | 7/1984 | Hitchcock | 60/262.2 |
| 4,884,748 | 12/1989 | Ward et al. | 60/230 |
| 4,930,308 | 6/1990 | Fage | 60/262.2 |
| 5,224,342 | 7/1993 | Lair | 244/110 B |
| 5,370,402 | 12/1994 | Gardner et al. | 277/27 |

FOREIGN PATENT DOCUMENTS

| | | |
|---|---|---|
| 503963 | 9/1992 | European Pat. Off. ........... 60/230 |
| 2126922 | 10/1972 | France . |
| 2456216 | 12/1980 | France . |
| 2551132 | 3/1985 | France . |
| 985192 | 3/1965 | United Kingdom . |

Primary Examiner—Richard A. Bertsch
Assistant Examiner—Ted Kim
Attorney, Agent, or Firm—William R. Hinds

[57] ABSTRACT

The invention concerns a dual-flow turbine engine equipped with a thrust reversal system and at least one device for restricting the annular channel for the ejection of cold gases. According to the invention, each restriction device, consisting of a fitting (7) and a shutter (8) pivoting with respect to the said fitting, has sealing means disposed between the said shutter and fitting, adapted for defining at least one airtight chamber (12, 13) between these last two, each fitting (7) having, in line with each chamber, at least one orifice. Furthermore, elastic means are arranged so as to act on the shutter (8) in such a way as to produce an initial release of the latter. These devices aim to guarantee the holding of the shutter (8) in its closed position, where it is clamped against the fitting (7), during flight, whilst ensuring the opening of this shutter after landing, under the effect of the elastic means.

10 Claims, 6 Drawing Sheets

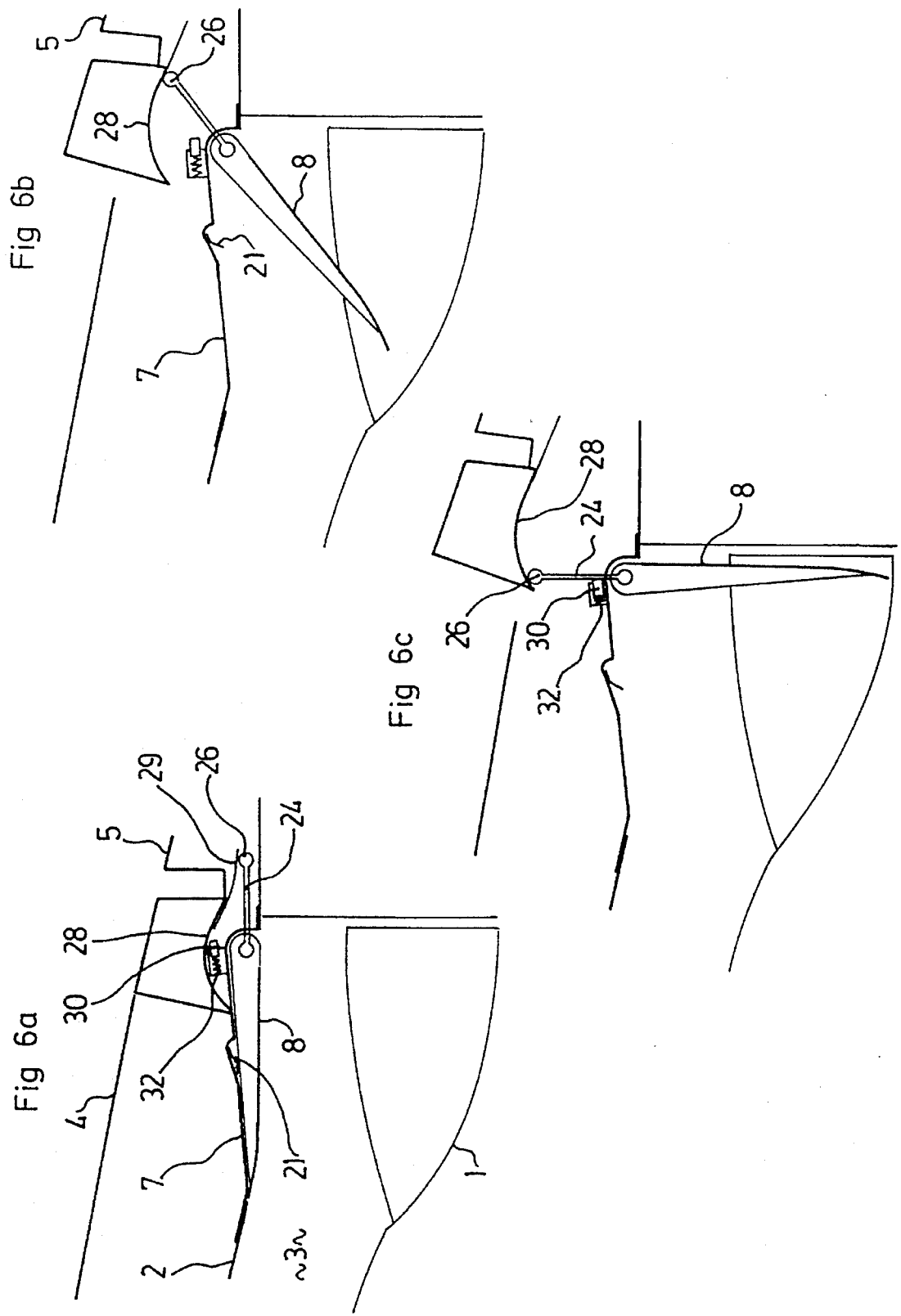

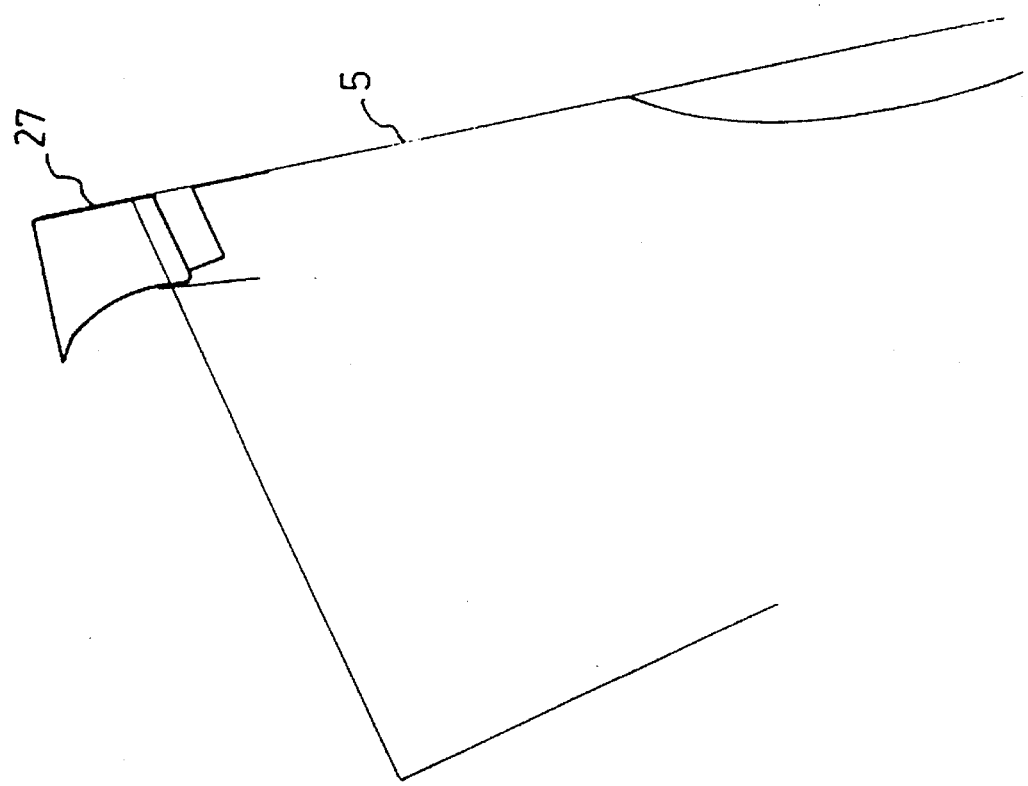
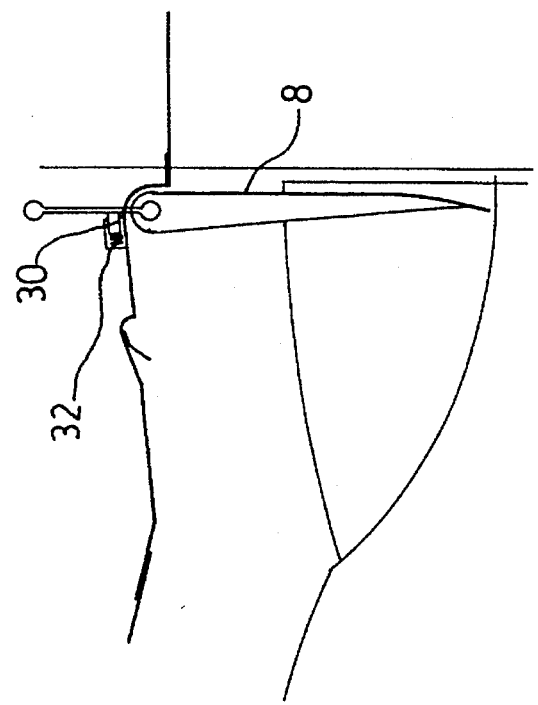
Fig 6d

DUAL-FLOW TURBINE ENGINE EQUIPPED WITH A THRUST REVERSAL SYSTEM AND A DEVICE FOR RESTRICTING THE ANNULAR CHANNEL FOR THE EJECTION OF COLD GASES, AND A RESTRICTION DEVICE EQUIPPING SUCH A TURBINE ENGINE

The invention concerns a dual-flow turbine engine equipped with a thrust reversal system and a device for restricting the annular channel for the ejection of cold gases. It extends to a restriction device equipping such a turbine engine.

Dual-flow turbine engines have a central generator for channelling a jet of hot gas and a pipe defining, around the said central generator, an annular by-pass duct for channelling a relatively cold jet of gas.

The drawback with such turbine engines, when they are equipped with a thrust reversal system having swing doors disposed in line with the pipe, lies in the fact that these doors receive directly, in their deployed position, the jet of hot gas leaving the central generator. The structure of the doors must, in fact, be designed to be able to withstand high temperatures, which leads to the production of a door that is costly in terms of technology and materials.

In order to overcome this drawback, a solution has consisted, as described in the patent FR 2 456 216, of disposing, in the annular channel for the ejection of cold gases, shutters designed to restrict the cross section through which the gas jet passes, when the swing doors open.

Such shutters, which are retracted in the folded position of the swing doors of the thrust reversal system, are arranged so as to pivot about transverse pivot axes when these doors are deployed and thus partially to close off the annular by-pass duct.

As stated in the aforementioned French patent, the presence of these shutters entails a modification of the ratio between the total pressure of the cold jet and the total pressure of the hot jet, which enables a jet of gas to be obtained at the outlet of the turbine engine in which the jet of hot gas is "enveloped" by the jet of cold gas. Consequently, the doors in the deployed position are essentially in contact with the jet of cold gas and are therefore subjected to moderate temperatures. Moreover, the performance of the engine is not adversely affected by the presence of the shutters, since the latter are used only during the braking phase.

Although the solution described above is one of the most attractive, it does, however, run into problems concerned with concepts of safety.

This is because any failure (mechanical, etc) of the shutter control means entails a pivoting of these shutters towards their open position where they partially obstruct the annular by-pass channel, entailing a change in the performance of the turbine engine, the consequences of which can be very damaging in the course of a flight.

Furthermore, the device for mechanically actuating the shutters that is described in the aforementioned French patent proves to be fragile, in the first place, and, in the second place, leads to the shutters being subjected to impacts that can lead to the deterioration of these shutters.

For these reasons, this mechanical actuation device has been replaced by a hydraulic system coupled with the hydraulic system for actuating the swing doors. However, in the first place, this solution is complex (added pipes, weight, etc), with the inherent risks of a lack of reliability, and, in the second place, the problems affecting the safety concepts are not resolved.

The present invention aims to overcome these drawbacks, and has as its object the provision of a dual-flow turbine engine equipped with a thrust reversal system and a restriction device of the mechanical type, the said restriction device, very simple in design, having all guarantees as regards its reliability and safety in use.

To this end, the invention concerns a turbine engine of the dual-flow type, comprising:

a central generator for channelling a jet of hot gas, and a pipe disposed around the central generator in such a way as to define an annular by-pass duct, for channelling a jet of relatively cold gas, the said pipe itself being surrounded by a fairing, a thrust reversal system with swing doors disposed in line with the pipe, at least one device for restricting the annular by-pass duct consisting of a fitting forming a seat and a shutter the shape of which is adapted for being housed inside the seat of the fitting, the said shutter being borne by a shaft pivoting with respect to the fitting and mounted so as to project with respect to the said shaft, each of the said restriction devices being positioned in a cutout formed in the pipe, in such a way that the pivot axis extends substantially transversely with respect to the longitudinal axis of the turbine engine, downstream of the shutter with respect to the direction of ejection of the gases, and the fitting being sealingly fixed to the pipe, pivoting means for each shutter, arranged so as to cause it to pivot between two extreme positions: an open position in which the said shutter obstructs a section of the annular by-pass duct, and a closed position in which the shutter is housed inside the associated seat, and in which it has the same profile as the internal face of the pipe.

According to the invention, this turbine engine is characterised in that:

sealing means are disposed between the shutter and the seat of each restriction device, adapted for defining at least one airtight chamber between the said shutter and seat, in the closed position of the shutter, each seat having, in line with each of the chambers, at least one communication orifice between the chamber and the space between the pipe and the fairing, so as to subject the shutter to an overpressure force F suitable for keeping it clamped in its seat, and such that:

$$F = S \times (Pc - Pe)$$

where:
S is the total surface area of the shutter delimited by sealing means,
Pc is the pressure in the annular by-pass duct, and
Pe is the pressure in the chambers which, under steady operating conditions, corresponds to the pressure in the space between pipe and fairing, that is to say the external pressure, elastic means are arranged so as to act on each shutter in such a way as to produce an initial release of the said shutter from its closed position, when the overpressure force F falls below a predetermined threshold value corresponding to a slowed operating speed of the turbine engine.

The turbine engine according to the invention therefore includes a restriction device provided with safety means which enable a normal operation of each shutter to be obtained even in case of a failure of the pivoting means, and this, in the first place, during flight, where the shutter is held in the closed position under the effect of the overpressure force and, in the second place, on the ground, where the shutter is released from its seat under the action of the elastic means, the continued pivoting of this shutter then being brought about by the jet of cold gas rushing between the said shutter and seat.

According to another characteristic of the invention, each orifice formed in a seat in line with an airtight chamber is a small calibrated orifice.

This small calibration of the orifices does not reduce the overpressure force at all, and enables the leakage rate of the cold gas to be limited when the shutters are in the open position.

Furthermore, according to another characteristic of the invention, the sealing means delimiting each airtight chamber are compressible and adapted so as to have, in the absence of any force acting on them, a thickness that is greater than the space between shutter and seat, in line with each chamber, in the closed position of the said shutter.

The compressible nature of these sealing means, combined with the calibration of the orifices, enables a damper to be produced for the shutter, when the latter is closed.

According to a preferential embodiment, each seat has at least one recess projecting outwards, adapted for housing a corresponding rib projecting with respect to the shutter, the said recess and rib being provided, opposite each other, with orifices suitable for housing an articulation pivot fixed to each rib and able to rotate freely with respect to the fitting.

This arrangement enables leakages of cold gas to be limited to the maximum extent, both during flight and on the ground, by virtue of the fact that these leakages can occur only through the annular space, which is very limited, formed around the articulation pivot, in line with each orifice formed in a recess.

Furthermore, the restriction device advantageously comprises an elastic stop disposed on the external face of the fitting and arranged so as to be acted on by the shutter, at the end of opening of the latter.

Such a stop serves as a damper, preventing any impact at the end of the opening of the shutter.

Moreover, according to another characteristic of the invention, the elastic means for the initial release of the shutter consist of at least one spring disposed in a niche formed in the bottom of a recess, at a distance from the articulation axis.

By virtue of this arrangement, the elastic means producing the initial release of the shutter are in direct contact with the said shutter and the seat, and their activation is guaranteed, whatever type of failure may occur.

Furthermore, the pivoting means, for their part, advantageously consist of:

a lever fixed to the articulation pivot and provided with a free end bearing a guide member, a cam disposed level with the front edge of one of the swing doors of the thrust reversal system, the said cam having a curved sliding surface arranged so as to be in contact with the guide member of the lever in such a way as to bring about a progressive pivoting of the said lever at the start of the opening and at the end of the closure of the said swing door, an elastic blade disposed in line with, and downstream of, the sliding surface of the cam and arranged so as to be acted on by the guide member of the lever at the end of the closure of the swing door and in the closed position of the said door.

Such pivoting means are remarkable for their simplicity, since they require neither individual motorisation nor individual regulation.

Moreover, from the mechanical point of view, their simplicity is also remarkable, since these pivoting means have only a single articulation axis and a single lever, both associated with a cam which guides the end of the lever.

Furthermore, the elastic blade forming the end part of the cam, guarantees, firstly, the total retraction of the shutter, regardless of the manufacturing tolerances, wear, thermal expansion, etc, and, secondly, enables any "over-retraction" of the swing doors at the end of the closure to be taken up without any risk of breakage of the lever.

In addition, this elastic blade constitutes a damper preventing any impact at the end of the closure of the shutter.

The invention extends to a restriction device for the annular by-pass duct defined by a dual-flow turbine engine pipe, having a fitting forming a seat, and a shutter whose shape is adapted for being housed inside the seat of the fitting, in a so-called closed position, the said shutter being borne by a shaft pivoting with respect to the fitting and being mounted so as to project with respect to the said shaft, the said restriction device being characterised in that it comprises:

sealing means disposed between the shutter and the seat, adapted for defining at least one sealed chamber between the said shutter and seat, in the closed position of the shutter, each seat having, in line with each of the chambers, at least one orifice, elastic means arranged so as to act on each shutter in such a way as to produce an initial release of the said shutter from its closed position.

Figure 2:
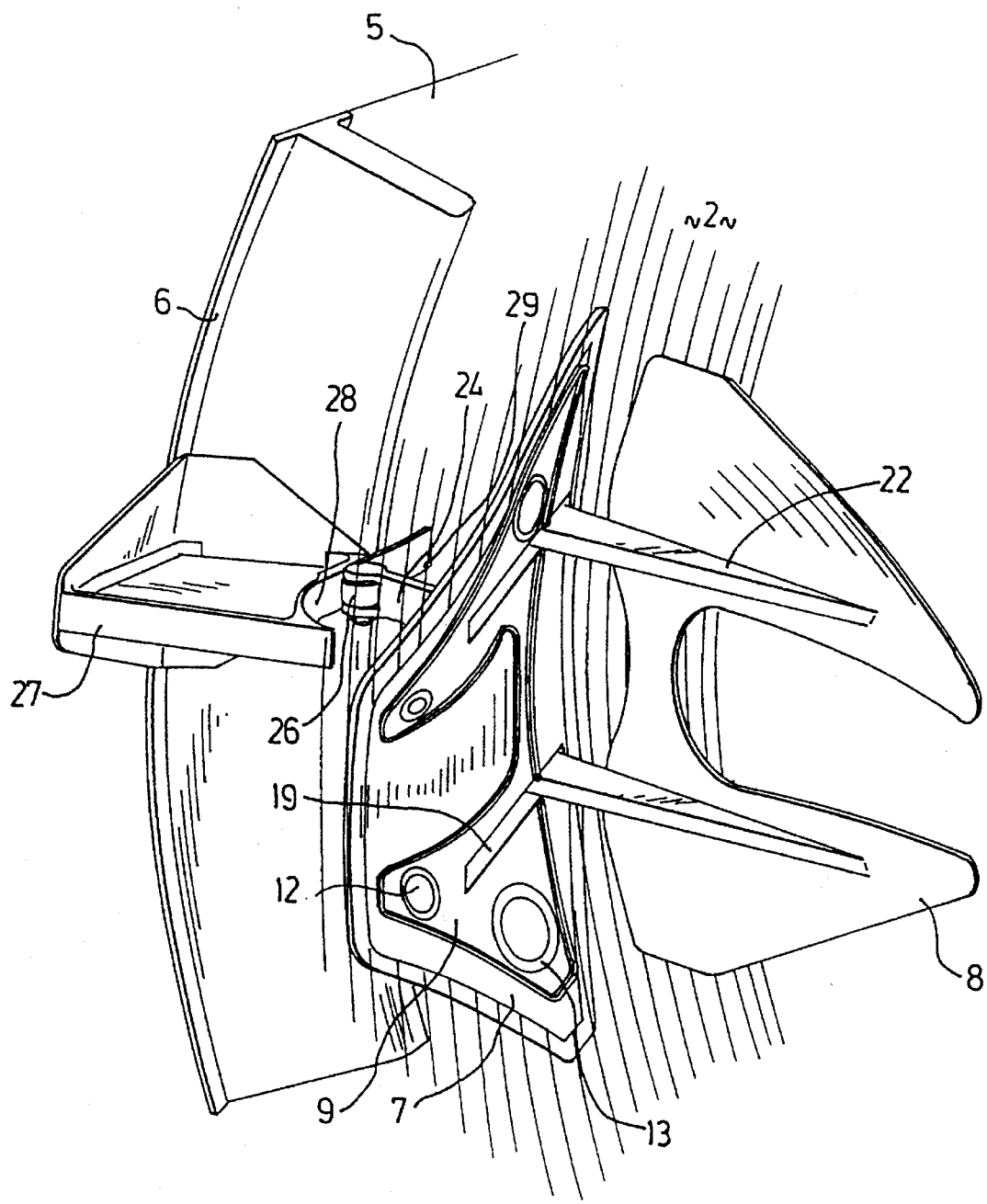
Figure 3:
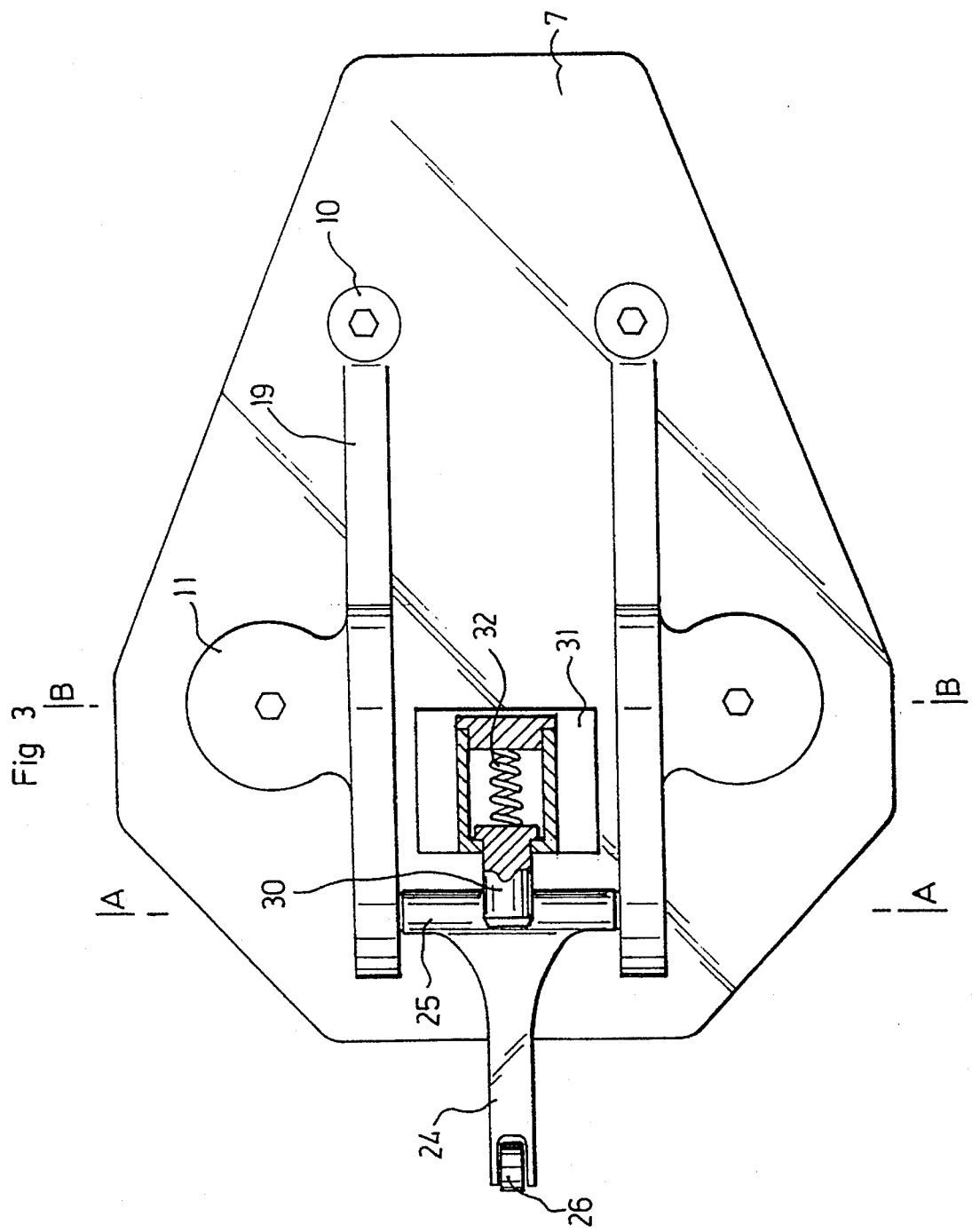
Figure 4:
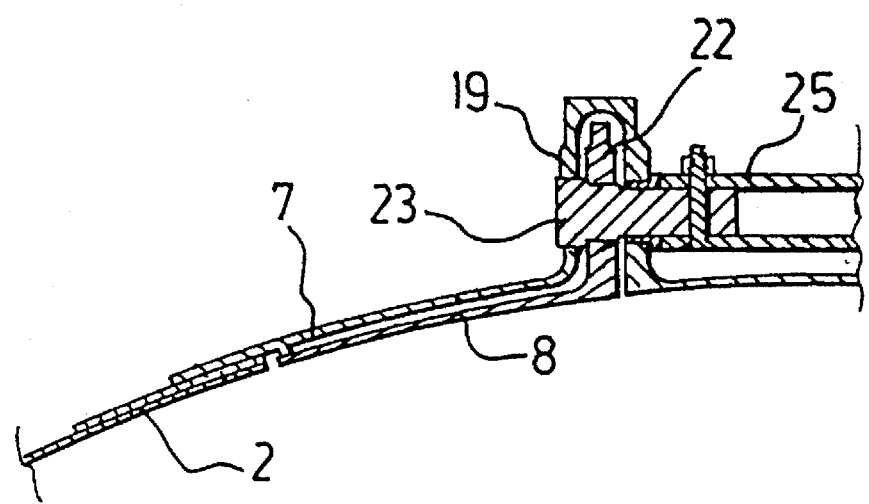
Figure 5:
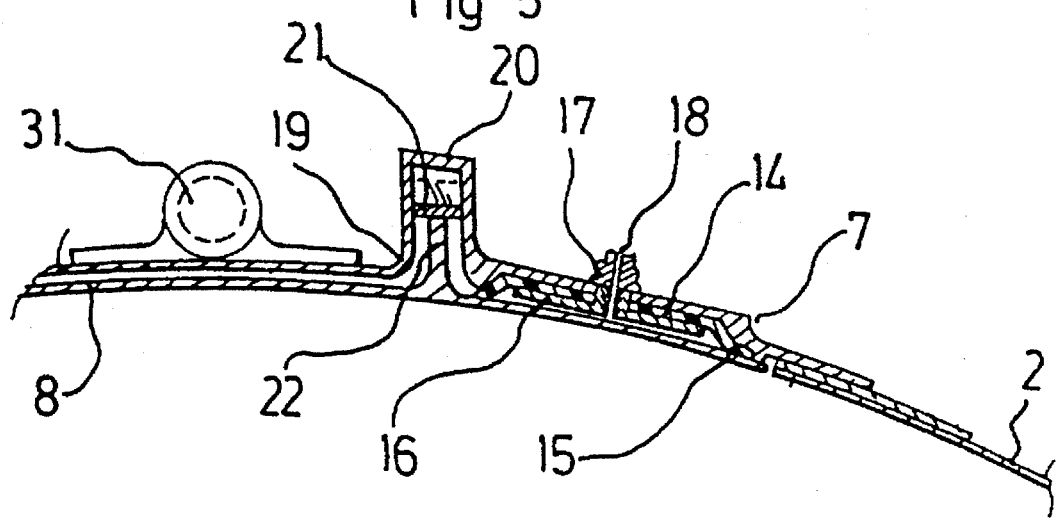

Other characteristics, aims and advantages of the invention will emerge from the detailed description which follows, with reference to the accompanying drawings which depict, by way of non-limitative example, a preferential embodiment thereof. In these drawings, which form an integral part of the present description:

FIG. 1 is a perspective view of a restriction device in accordance with the invention, seen from the outside of the pipe, FIG. 2 is a perspective view thereof, seen from the inside of the pipe, FIG. 3 is a plan view, with partial cutaway, FIG. 4 is a partial cross section along a vertical plane A, FIG. 5 is a partial cross section along a vertical plane B, and FIGS. 6a to 6d are functional diagrams depicting the various phases in the opening of this restriction device.

The dual-flow turbine engine, in accordance with the invention, depicted schematically in FIGS. 6a to 6d, has, in a conventional manner, a central generator 1 for channelling a jet of hot gas, a pipe 2 disposed around the central generator and defining an annular by-pass duct 3, for channelling a jet of relatively cold gas, and a fairing 4 surrounding the pipe 2.

Furthermore, in the example depicted, the turbine engine is of the mixed-flow type, that is to say the central generator 1 has a series of peripheral convolutions.

This turbine engine also has a thrust reversal system provided with swing doors such as 5, only the front transverse reinforcing frame 6 of which is depicted in FIGS. 1 and 2. These doors 5 pivot, in a conventional manner, about transverse axes, and are arranged so as to pivot between two extreme positions: a folded position, depicted in FIG. 6a, where they are in line with the fairing 4, and a deployed position, depicted in FIG. 6d, where they lie transversely with respect to the gas jets emerging from the turbine engine, so as to reverse the direction of the said jets.

Finally, this turbine engine comprises at least one restriction device arranged so as partially to block the annular by-pass duct 3, in the deployed position of the swing doors 5. As described in the patent FR 2 456 216, these devices are advantageously two in number, each associated with a swing door 5, disposed diametrically opposite each other in the vicinity of the rear end of the pipe 2.

Each of these restriction devices, positioned inside a cutout formed in the pipe 2, consists of a fitting 7, larger in size than the cutout, sealingly fixed to the external face of the pipe 2 around the periphery of the said cutout, and a shutter 8, pivoting about a shaft fixed to the fitting 7, and whose shape is adapted for obstructing a section of the annular by-pass duct 3.

To this end, this shutter 8 is of a general U shape, complementing the Ω shape of the convolutions of the central generator 1.

In the first place, the fitting 7 has a bottom face forming a seat 9 whose shape is conjugate with that of the shutter 8 adapted for housing the latter in such a way that it has the same profile, in a so-called closed position, as the internal face of the pipe 2.

In line with this seat 9, the fitting has projections such as 10, 11, numbering four in the example, disposed respectively on the same level as the base and as the end of each "wing" of the said seat, and each defining a cavity such as 12, 13, circular in shape, recessed with respect to the face of the said seat serving as a support for the shutter.

Each of these cavities 12, 13 houses a sealing membrane such as 14 bounded peripherally by a rim 15 taking the form of a lip seal, the height of which is greater than the depth of the said cavity. Each of these membranes 14 is held clamped in an airtight manner against the bottom of the cavity by means of a washer 16, and a bolt 17 which cooperates with the said washer and whose head projects outside the fitting 7.

Furthermore, each of the bolts 17 has in it a calibrated longitudinal bore 18.

The fitting 7 has, moreover, two parallel longitudinal grooves, such as 19, formed by a recess projecting towards the outside of the said fitting. Each of these grooves 19, whose cross section is substantially rectangular, has a depth that increases from its upstream end to its downstream end, the said downstream end also having longitudinally a curved shape and having facing orifices formed transversely in it.

Furthermore, each of these grooves 19 is provided, at a distance from its downstream end, with a niche 20 formed in the bottom of the said groove, the said niche housing a Z-shaped leaf spring 21 arranged so as to project outside the said groove.

Each shutter 8 is, for its part, provided with two ribs such as 22, the shapes of which are adapted for being housed in each case in a groove 19, and arranged so as to allow the relative pivoting of the said shutter with respect to the said seat. To this end, each of the ribs has an orifice formed transversely in it towards its downstream end so as to coincide with the orifices in the grooves 19 of the fitting 7.

The pivot axis of this shutter 8 consists, for its part, of pivots 23 housed in the facing orifices in the ribs 22 of the shutter 8 and grooves 19 of the fitting 7, the said pivots being arranged in such a way as to be free in rotation with respect to the fitting 7 and fixed to the shutter 8.

Each of the restriction devices described above is associated with pivoting means including, in the first place, a lever 24 taking, towards one of its ends, the form of a sleeve 25 housing the articulation pivots 23, fixed in rotation with respect to the said pivots.

This lever 24, the shape of which is trapezoid overall, is also provided, towards its end opposite the sleeve 25, with a running roller 26.

The pivot means, arranged so as to tie the pivoting of the shutters 8 to the opening and closing movements of the swing doors 5, also include a profiled member 27 fixed to the reinforcing frame 6 of the said doors, having a curved face 28 arranged so as to serve as a running surface for the roller 26, suitable for producing:

a pivoting of the shutter 8 towards an open position closing off the annular by-pass 3 when the swing doors 5 are open, a reverse pivoting of the shutter 8 towards a closed position in which it is once again housed inside the seat 9 of the fitting 7, when the swing doors 5 are closed.

Furthermore, this running face 28 is extended, at its downstream end, by an elastic blade 29 continuing the said face and arranged so as to guide the roller 26 at the end of the closing of the swing doors 5.

Finally, each restriction device includes a stop member suitable for damping the shutter 8 at the end of the opening of the latter. This stop member consists of a pin 30 mounted so as to slide inside a casing 31 fixed to the external face of the fitting 7, the said pin being arranged so as to project outside the casing 31 under the effect of a spring 32 housed in the said casing, and being arranged so as to be acted on by the lever 24 at the end of the pivoting of the shutter.

As illustrated in FIGS. 6a to 6d, the principle of operation of the restriction devices described above is as follows:

In the folded position of the swing doors 5 (FIG. 6a), the shutter 8 is housed inside the seat 9 of the fitting 7. In this position, this shutter has the same profile on the inside as the internal face of the pipe 2. Furthermore, it is clamped against the seat 9 by an overpressure force F proportional to the total surface area of the said shutter delimited by the lip seals 15, and resisting the force of the springs 21, the said overpressure force being such that:

$$F = S \times (Pc - Pe)$$

where:

S is the total surface area of the shutter 8 delimited by sealing means,

Pc is the pressure in the annular by-pass duct 3, and

Pe is the pressure in the chambers which, under steady operating conditions, corresponds to the pressure in the space between pipe 2 and fairing 4, that is to say the external pressure.

When the swing doors 5 are opened (FIG. 6b), this being when the aircraft is on the ground and when the turbine engine is running at a slow speed such that the overpressure force F falls below the force exerted by the springs 21, the said springs produce an initial release of the shutter 8. Subsequently, this shutter pivots progressively under the effect of the pressure of the jet of cold gas rushing between the said shutter and the fitting 7, this progressive opening being, moreover, obtained by virtue of the running of the roller 26 along the running surface 28.

At the end of pivoting (FIG. 6c), the lever 24 of the shutter 8 comes to abut against the pin 30 serving as a damper by virtue of the presence of the spring 32, and the shutter 8 is positioned in its position blocking the annular by-pass duct 3 (FIG. 6d).

During the reverse closing movement of the doors 5, the profiled member 27, fixed to the frame 6 of the said doors, makes contact with the roller 26 through its running surface 28, giving rise to a progressive pivoting of the shutter 8 towards its closed position.

Moreover, at the end of the pivoting of this shutter, the roller 26 is positioned on the elastic blade 29 which serves as a damper and allows an "over-retraction".

Furthermore, at the time of this closure, the chambers delimited between the shutter 8 and the seat 9 of the fitting 7 by the lip seals 15 form a cushion of air which also serves as a damper.

What is claimed is

1. A restriction device for the annular by-pass duct (3) defined by a dual-flow turbine engine pipe (2), having a fitting (7) forming a seat (9), and a shutter (8) whose shape is adapted for being housed inside the seat (9) of the fitting (7), in a closed position, the said shutter being borne by a shaft (23) pivoting with respect to the fitting (7) and being mounted so as to project with respect to the said shaft, the said restriction device comprising:

sealing means (14, 15) disposed between the shutter (8) and the seat (9), adapted for defining at least one sealed chamber between the said shutter and seat, in the closed position of the shutter, each seat (9) having, in line with each of the chambers, at least one orifice (18), elastic means (21) arranged so as to act each shutter (8) i such a way as to produce an initial release of the said shutter from its closed position.

2. A turbine engine of the dual-flow type, comprising:

a central generator (1) for channelling a jet of hot gas, and a pipe (2) disposed around the central generator (1) in such a way as to define an annular by-pass duct (3), for channelling a jet of relatively cold gas, the said pipe itself being surrounded by a fairing (4), a thrust reversal system with swing doors (5) disposed in line with the pipe (2), at least one device for restricting the annular by-pass duct (3) consisting of a fitting (7) forming a seat (9) and a shutter (8) the shape of which is adapted for being housed inside the seat (9) of the fitting (7), the said shutter being borne by a shaft (23) pivoting with respect to the fitting (7) and mounted so as to project with respect to the said shaft, each of the said at least one restriction devices being positioned in a cutout formed in the pipe (2), in such a way that the pivot axis (23) extends substantially transversely with respect to the longitudinal axis of the turbine engine, downstream of the shutter (8) with respect to the direction of ejection of the gases, and the fitting (7) being sealingly fixed to the pipe (2), pivoting means (24–29) for each shutter (8), arranged so as to cause it to pivot between two extreme positions: an open position in which the said shutter obstructs a section of the annular by-pass duct (3), and a closed position in which the shutter (8) is housed inside the associated seat (9), and in which it has the same profile as the internal face of the pipe (2), in which turbine engine:

sealing means (14, 15) are disposed between the shutter (8) and the seat (9) of each restriction device, adapted for defining at least one airtight chamber between the said shutter and seat, in the closed position of the shutter, each seat (9) having, in line with each of the chambers, at least one communication orifice (18) between the chamber and the space between the pipe (2) and the fairing (4), so as to subject the shutter (8) to an overpressure force F suitable for keeping it clamped in its seat (9), and such that:

$F = S \times (Pc - Pe)$ where:

S is the total surface area of the shutter (8) delimited by sealing means (14, 15), Pc is the pressure in the annular by-pass duct (3), and Pe is the pressure in the chamber which, under steady operating conditions, corresponds to the pressure in the space between pipe (2) and fairing (4), that is to say the external pressure, elastic means (21) are arranged so as to act on each shutter (8) in such a way as to produce an initial release of the said shutter from its closed position, when the overpressure force F falls below a predetermined threshold value corresponding to a slowed operating speed of the turbine engine.

3. The turbine engine as claimed in claim 2, wherein each orifice (18) formed in a seat (9) in line with an airtight chamber is a small calibrated orifice.

4. The turbine engine as claimed in claim 3, wherein the sealing means (14, 15) delimiting each airtight chamber are compressible and adapted so as to have, in the absence of any force acting on them, a thickness that is greater than the space between shutter (8) and seat (9), in line with each chamber, in the closed position of the said shutter.

5. The turbine engine as claimed in claim 2, wherein each seat (9) has at least one recess (19) projecting outwards, adapted for housing a corresponding rib (22) projecting with respect to the shutter (8), the said recess and rib being provided, opposite each other, with orifices suitable for housing an articulation pivot (23) fixed to each rib (22) and able to rotate freely with respect to the fitting (7).

6. The turbine engine as claimed in claim 4, wherein each recess in the seats (9) consists of a longitudinal groove 7. The turbine engine as claimed in claim 5 comprising an elastic stop (30, 32) disposed on the external face of the fitting (7) and arranged so as to be acted on by the shutter (8), at the end of opening of the latter.

8. The turbine engine as claimed in claim 7, wherein the elastic means for the initial release of the shutter (8) consist of at least one spring (21) disposed in a niche (20) formed in the bottom of a groove (19), at a distance from the articulation axis (23).

9. The turbine engine as claimed in claim 5, wherein the pivoting means comprise:

a lever (24) fixed to the articulation pivot (23) and provided with a free end bearing a guide member (26), a cam (27) disposed level with the front edge of one of the swing doors (5) of the thrust reversal system, the said cam having a curved sliding surface (28) arranged so as to be in contact with the guide member (26) of the lever (24) in such a way as to bring about a progressive pivoting of the said lever at the start of the opening and at the end of the closure of the said swing door, an elastic blade (29) disposed in line with, and downstream of, the sliding surface (28) of the cam (27) and arranged so as to be acted on by the guide member (26) of the lever (24) at the end of the closure of the swing door (5) and in the closed position of the said door.

10. The turbine engine as claimed in claim 8, wherein the guide member consists of a roller (26) arranged so as to roll along the sliding surface (28).

* * * * *